(12) United States Patent
Wallach

(10) Patent No.: US 7,390,560 B2
(45) Date of Patent: Jun. 24, 2008

(54) SMART COATING SYSTEMS

(75) Inventor: Morton L. Wallach, Groton, CT (US)

(73) Assignee: PEL Associates, Groton, CT (US)

( * ) Notice: Subject to any disclaimer, the term of this patent is extended or adjusted under 35 U.S.C. 154(b) by 381 days.

(21) Appl. No.: 11/093,478

(22) Filed: Mar. 30, 2005

(65) Prior Publication Data
US 2006/0062981 A1   Mar. 23, 2006

Related U.S. Application Data

(60) Provisional application No. 60/635,173, filed on Dec. 10, 2004, provisional application No. 60/558,880, filed on Apr. 2, 2004.

(51) Int. Cl.
*B32B 25/20* (2006.01)
*B32B 27/08* (2006.01)
*B32B 27/18* (2006.01)
*B32B 27/30* (2006.01)
*B32B 27/32* (2006.01)
*B32B 27/40* (2006.01)
*B32B 33/00* (2006.01)

(52) U.S. Cl. .................. 428/215; 428/411.1; 428/421; 428/423.1; 428/447; 428/475.5; 428/522; 428/523; 428/913

(58) Field of Classification Search ............ 134/1; 114/361; 428/215, 339, 411.1, 421, 423.1, 428/447, 475.5, 522, 523, 913
See application file for complete search history.

(56) References Cited

U.S. PATENT DOCUMENTS 7,297,399 B2   11/2007  Zhang et al.
2004/0005465 A1*  1/2004  Oda et al. .................. 428/422

OTHER PUBLICATIONS

Robert F. Brady, Jr., "Modern Organic Surface Coatings for the Marine Industry", Proceedings of the American Chemical Society National Meeting, Dallas, TX, Mar. 29-Apr. 3, 1998, pp. 249-250.
"Surface Free Energy", *Introduction to Biomaterials Properties*, University of Michigan Press, Apr. 1996. http://www.lib.umich.edu/dentlib/Dental_tables/Surffreener.html, last viewed Mar. 11, 2008.

* cited by examiner

*Primary Examiner*—Ramsey Zacharia
(74) *Attorney, Agent, or Firm*—Mark S Nowotarski

(57) ABSTRACT

A coating system for defouling a substrate, such as a ship hull, immersed in water or seawater for long periods of time comprises a conductive layer, an antifouling layer and a means for providing an energy pulse to said conductive layer. The conductive layer comprises polymers, such as carbon filled polyethylene, which are electrically conductive. The antifouling layer comprises polymers, such as polydimethylsiloxane, which have a low surface free energy. The layers are designed such that when the conductive layer is exposed to a pulse of electrical, acoustic or microwave energy or combinations thereof, said conductive layer separates from said antifouling layer.

22 Claims, 2 Drawing Sheets

SHIP ENERGETIC COATING
RELEASE SYSTEM

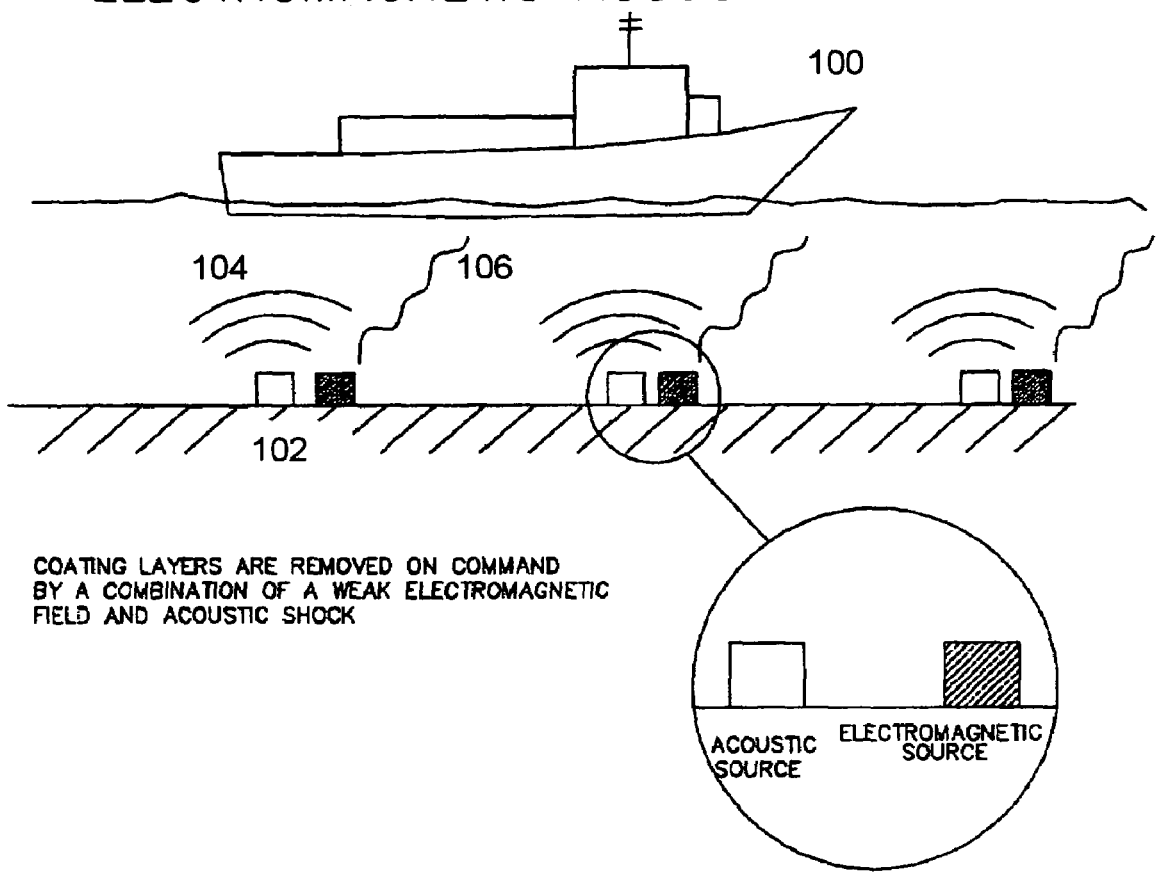

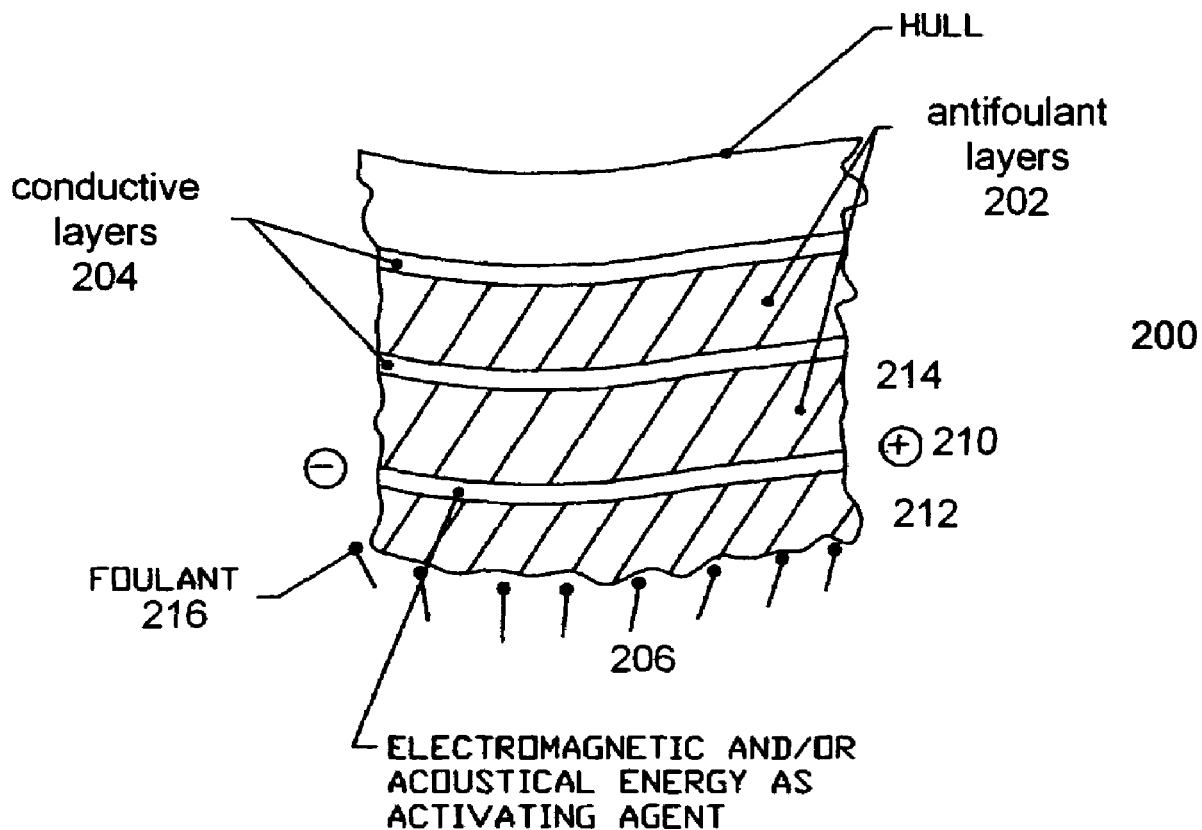

SMART COATING SYSTEMS

CROSS-REFERENCE TO RELATED APPLICATION

This application claims the benefit of U.S. provisional patent application Ser. No. 60/558,880, filed Apr. 2, 2004, and entitled "Surface Renewal of Antifouling Coating on Command". Said provisional application, Ser. No. 60/558,880, is incorporated herein by reference.

This application further claims the benefit of U.S. provisional patent application Ser. No. 60/635,173, filed Dec. 10, 2004, and entitled "Smart Self-Renewable Medical Stent Coatings". Said provisional application, Ser. No. 60/635,173, is incorporated herein by reference.

This application further incorporates by reference U.S. provisional patent application Ser. No. 60/462,946, filed Apr. 15, 2003, and entitled "Surface Renewal of Antifouling Coating on Command".

FIELD OF INVENTION

This invention is in the field of multilayer composite polymer coatings.

BACKGROUND

There is a long felt need for a renewable coating for the removal of foulant from a substrate immersed in water, seawater, river or lake water for periods of time.

SUMMARY OF THE INVENTION

The Summary of the Invention is provided as a guide to understanding the invention. It does not necessarily describe the most generic embodiment of the invention or all species of the invention disclosed herein.

The invention comprises a coating array to protect substrates that are to be immersed in seawater or river or lake water for periods of time. Said coatings tend to become fouled. The coating comprises at least one pair of an exterior antifoulant layer and interior conductive layer. The conductive layer is designed such that when exposed to an electrical, acoustical or other signal, it separates from the material above it such that said conductive layer and the antifoulant layer below it and any fouling agents adhering to said outer antifoulant layer are shed. This exposes the material above the conductive layer. Said material is ordinarily another antifoulant layer.

A multiplicity of pairs of antifoulant layers and conductive layers up to 100 or more pairs may be provided such that said antifoulant layers may be shed sequentially over time as they become fouled.

BRIEF DESCRIPTION OF DRAWINGS

FIG. 1 is an illustration of a process and equipment for shedding an outer antifouling layer from a ship.

FIG. 2 is an illustration of a cross section of the multilayer composite coating of the present invention.

DETAILED DESCRIPTION

The following detailed description discloses various embodiments and features of the invention. These embodiments and features are meant to be exemplary and not limiting.

The present invention comprises a multi-layered composite coating system suitable for the release of an outer coating layer by the application of electrical, acoustical or other signal.

An exemplary coating is illustrated in FIG. 2. The coating 200 comprises a layered system composed of pairs of two morphologically and compositionally alternating layers. One layer 202, referred to herein as an "antifoulant layer", may comprise a low free energy slippery polymer, such as a polydimethylsiloxane derivative or one of the fluorinated polymers (e.g., fluorinated polyolefin derivative). The other layer 204, referred to herein as a "conductive layer", may comprise either an electrically conductive polymeric material, a non-conducting polymer rendered conductive by a conductive filler material or a mixture of both. Said conductive filler material may comprise conductive fiber or particles in the nano to micron size range. Said conductive layer has the ability to absorb electrical, acoustic, microwave energy or combinations thereof. The conductive layer is preferably thinner than the antifoulant layer. The antifoulant layer is preferably slippery and ablative. The debonding process can be aided in a particular situation by the addition of slip agents such as silicones or waxes to the antifouling layer as described in U.S. nonprovisional patent application Ser. No. 11/056,023 entitled "Smart Polymeric Multilayer Sensors", filed Feb. 11, 2005. Said nonprovisional patent application is incorporated herein by reference.

When an outer antifoulant layer 212 becomes significantly fouled 216 (for example, when applied to the hull of a ship and after said ship has been 1-2 months at sea), the conductive layer 210 immediately above it will be subjected to an energy pulse, such as a shock voltage, acoustic energy or combination of both. Said energy pulse may be applied either from within said ship or from a station/cradle. When so shocked the conductive layer will separate from the antifoulant layers adjacent to it, including the fouled layer, thus exposing a clean, fresh unfouled surface of the antifoulant layer 214 above it.

The multi-layered composite coating system may be formed by a multilayer co-extrusion or other coating process such as spray coating, bar, or air knife coating, etc. The conductive and antifoulant layers have thicknesses so chosen as to provide, for example, twenty four months or more of use between energy activation. This period will also be dependant on the level of fouling. Ordinarily the conductive later is in the nano to micro size range. The antifoulant layer is in the micro to millimeter size range.

FIG. 1 illustrates a method and equipment for defouling a ship's hull coated with the inventive coating. Cradle stations 102 can be located at convenient locations in a water column akin to auto gas stations. They can be used when a ship 100 is so available. The cradle stations can provide acoustic 104 or electromagnetic 106 pulses to said ship thus causing the outer antifouling layer to be shed. By using the cradle, the ship's whereabouts will not be revealed by detection of the foulant released. However, after this treatment the ship can complete it's mission with full speed capability, maneuverability, and normal fuel use.

This renewal process can be repeated every twelve to twenty four months or other convenient period for which the antifoulant layer would be so designed. In this fashion the coating array can be so designed to have a life of 12 years or even up to the total life of the vessel.

EXAMPLE 1

Systems for use in defouling a ship hull's outer layer and exposing a fresh new surface are shown in FIG. 1 illustrating a ship with external energy activation on it's hull, and FIG. 2 showing the coating. A suitable conductive layer for releasing itself and its adjacent fouled outer antifoulant layer is in the thickness range of ¼ mil to 200 mils. Suitable conductive layer materials include but are not limited to polythiophene, polyfluorene and their derivatives and other conductive conjugated polymers as well as filled polyethylene, polyvinyl chloride, and their derivatives as well as filled polyphenylene sulfide and other water resistant polymers. Conductive fillers include but are not limited to conductive carbon, carbon fibers, and carbon nanotubes, with and without stainless steel coatings, as well as metal flakes or other particle morphologies and other metals including but not limited to copper, or aluminum. Resistivities of the conductive layer materials should be in the range of $10^8$ ohm-cm to 1 ohm-cm or even less.

Suitable antifoulant layer materials include but are not limited to polydimethylsiloxane, fluorinated polyurethanes, other fluorinated polymers and silicones, and their derivative as well as other low surface free energy polymers. The thickness of these layers should be in the range of 1/10 mil to 300 mils or more.

The coating comprises an array of alternating layers beginning with a thick smooth antifoulant layer and alternating with a thin conductive layer. The number of pairs of layers in the array can vary from 1 to 100 or more.

The term "outer layer" as used herein refers to the antifoulant layer exposed to the environment 206 (FIG. 2).

When an outer layer is to be removed, the conductive layer beneath it is released from the rest of the coating below it by a suitable shock energy applied to it. The energy can be electrical, acoustic, microwave or combinations thereof.

Suitable voltage levels for applying DC or AC electrical energy to the conductive layer are 10 to 250 volts or higher when needed. The voltage is applied across the length of the coating such that current flows laterally through the conductive layer. The voltage can be AC or DC. DC is preferable. The AC voltage may be at any suitable frequency, such as 60 hertz.

Electrical connections are made to the conductive layers by known means.

The coating may be applied in sections such that energy can be applied to the conductive layers of individual sections. The sections may be contiguous.

Without being bound by our explanation, it is believed that the electric shock separation results from the resistive heating of the conductive layer and a difference in coefficient of thermal expansion between the conductive layer and the adjacent antifoulant layers. Another potential mechanism is that there is a loss of interfacial energy between the conductive layer and the adjacent antifoulant layers upon heating. Another potential mechanism is that there is a scission of covalent interfacial bonds between the conductive layer and the low free surface energy antifoulant layer upon heating.

The electrical energy can be supplied via radio frequency or microwave radiation. The frequency of the radiation is selected so that it is not significantly absorbed by water adjacent to the coating. Preferably, the frequency of the radiation is selected such that it is absorbed by the molecular structure of the conductive layer material. For example the frequency may be selected to be specifically absorbed by the C—O, or Si—O, or C—F bonds of the conductive layer material.

The electric energy may be applied for 1 to 100 seconds or more.

The acoustic energy may be applied for 1 to 100 seconds or more. The acoustic energy may be 100-200 decibels or more re 1 µPa. Preferably, the acoustic signal has a frequency at the resonance frequency of the conductive layer to facilitate removal.

An advantage of a conductive layer that requires the combination of electrical and acoustic energy to separate it from an adjacent antifoulant layer is that unintended separation due to stray energy shocks encountered by the coating is minimized.

The separation energy can be initiated on command by personnel on the ship, or in the berthing area for a berthed ship, or a cradle located in a safe bay area. The fouled material may be disposed of either outside the 200 mile zone, or by the cradle operators in an environmentally acceptable manner, or, in the case of a military vessel on duty, in a manner suitable to their mission.

This invention can be employed on fouled pilings, bridge supports, pipes, etc. or on electronic or photonic devices as mentioned below.

The conductive layer chemistry and structure are designed to bond satisfactorily to the antifoulant layer but to debond at shock voltage. Functionalization of the conducting polymer will assist in the bonding process. Example functionalities that may be suitable include carboxyl, hydroxyl, anhydride, and other stable functional groups. This opens up a wide range of chemistries.

The antifoulant layer preferably has a low surface free energy. This facilitates the debonding mechanism. Also, appropriate plasticizing additives may be incorporated to further tune the release function. When shocked, the covalent and physical adhesive bonds are broken due to the energy absorbed by the conductive layer and may be manifested in the form of a local temperature rise.

EXAMPLE 2

A submarine has been cruising on and off in temperate waters for one year and the captain notices that the boat is using excess fuel and is not handling as well as it should. He orders the chief engineer to check the degree of fouling and he finds that it is at a very high level. The chief engineer then orders his technician to press a defouling button on a maintenance control panel which puts 200 volts DC for 30 seconds across the length of a 20 foot wide by 60 foot long, conductive layer immediately adjacent to a seriously fouled outer antifoulant layer of a coating. The outer antifoulant layer was originally 15 mils thick, but has been reduced to about 5 mils in thickness by wear. The conductive layer then separates from the coating array and exposes the fresh clean smooth surface of the antifoulant layer above it.

The coating array comprises 5 pairs of conductive layers and antifoulant layers. The array comprises several sections. The sections are 20 feet wide by 60 feet long. Some of the sections are contiguous to each other.

The antifoulant layers are composed of polydimethylsiloxane and are 15 mils thick.

The conductive layers are composed of polyethylene filled with conductive carbon fiber. The conductive layers are functionalized with carboxyl groups attached to the antifoulant layers via OH end termination. The conductive layers are about 10 mils thick and have a resistivity of $10^3$ ohm-cm.

On voltage application, the conductive layer immediately adjacent to the exposed antifoulant layer breaks away from the coating. This exposes the clean, unfouled antifoulant layer above it.

The combined thickness of the antifoulant layers is sufficient for twelve years of service in temperate or colder waters. Therefore the boat only needs to be berthed once in its 25-year life to replace the coating system.

EXAMPLE 3

A coast guard cutter has been in operation for two years in cold Canadian Atlantic waters and the second mate determines that there is serious fouling on the hull. As a result, the captain directs that the ship proceed to a cradle in a safe harbor where an operator subjects the conductive layer adjacent to the outer antifoulant layer to a combined electrical/acoustic shock. The outer antifoulant layer and adjacent conductive layer separate from the coating and the clean antifoulant layer above it is exposed.

The coating is applied in 20 foot wide by 40 foot long sections.

The antifoulant layers are made of a fluorinated polyurethane polymer and are about 12 mils thick.

The conductive layers are made of polyphenylene sulfide filled with carbon nanotubes such that the resistivity is $10^2$ ohm-cm. The conductive layers are about 8 mils thick.

When the cradle operator applies an electrical shock of 150 volts DC for 40 seconds to a conductive layer across the width of a section and an acoustic shock of 200 decibels re 1 µPa with a frequency at the conductive layer acoustic resonance frequency, the conductive layer separates from the antifoulant layer above it in the array thus exposing a fresh antifoulant layer. The separated layers are taken up by cradle personnel and stored away for future environmentally friendly discharge outside the 200 mile zone.

EXAMPLE 4

A cruise liner is on a trip to the Caribbean and the chief engineer on inspection becomes aware that the ship is fouled to a large degree. Since the passengers require that they keep to their allotted vacation time he decides to get the captain's permission to defoul in the open sea. The captain agrees and the defouling operator puts a voltage of 100 volts AC for 60 seconds across the width of a 40 foot wide by 80 foot long section of the conductive layer adjacent to the outer antifoulant layer. Both layers are shed thus exposing the fresh antifoulant layer above.

The conductive layers are made of an intrinsically conductive polymer of polythiophene. They are about 4 mils thick and have a resistivity of 10 ohm-cm.

The antifoulant layers are made of a polysilicone polymer. They are about 7 mils thick.

On being subjected to 100 volts, the conductive layer adjacent to the outer fouled antifoulant layer separates from it, and separates from the clean, fresh antifoulant layer of silicone polymer attached to the array which is now exposed to the water.

The defouling operator repeats the process for other fouled sections of coating. At this point the ship operator in the bridge notices a significant improvement in the ship's handling ability.

EXAMPLE 5

A nuclear power plant uses cooling water to keep the temperature of it's radioactive heat source under control. However, fouling of the inside of the pipes that withdraw and discharge water to the nearby river is decreasing the flow rate significantly and water heat-up is observed. The pipes have an internal coating comprising 3 pairs of conductive layer and antifoulant layer. The chief engineer then orders his technician to place a 125 volt DC electrical shock for 40 seconds across the length of a 4 foot long by 7 inch ID section of the conductive layer adjacent to the outer antifoulant layer. As a result, the fouled antifoulant layer and the adjacent conductive layer are released from the coating thus exposing a clean antifoulant layer. The pipe flow returns to normal and the temperature of the cooling water as well as the heating elements decrease to the required temperature.

The conductive layers in the coating array comprise high density polyethylene filled with conducting carbon fiber. The layers are about 6 mils thick and have a resistivity of $10^4$ ohm-cm.

The antifoulant layers comprise a fluorinated olefin polymer. They are about 14 mils thick.

The coating is applied to a primer. The pipes are made of polyvinyl chloride.

On being subjected to 125 volts DC across the length of the coating, the conductive layer separates from the adjacent antifoulant layers. Separation is facilitated by the difference in coefficients of thermal expansion of the two polymers (i.e., $2.5 \times 10^{-4}$ in/in/° C. for polyethylene and $0.5 \times 10^{-4}$ in/in/° C. for polytetrafluoroethylene) The water temperature then returns to normal.

EXAMPLE 6

An inspector notices severe foulant on a pier, its supports, and adjacent pilings extending out from the boardwalk in Atlantic City during the summer tourist season. The foulant is putting significant additional weight on the structure built only 10 years earlier and is contributing to the wood structural decay. The inspector orders the foulant to be cleaned up to extend the approved safe life of the pier. The supports and undersides of the pier and the piling surfaces have sections of coating on them. When a conductive layer is subjected to 120 volts RF microwave shock voltage to the length of 10 feet long by 10 inch diameter section of coating on a piling for one minute, the adjacent antifoulant layers separate from the conductive layer and the foulants are removed from the piling's surface. Sections of coating on the pier and supports are similarly treated and clean antifoulant layers are exposed.

The conductive layers are made of polyphenylene sulfide filled with aluminum flakes. They are 4 mils thick with a resistivity of $10^2$ ohm-cm.

The antifoulant layers are made of polydimethylsiloxane of about 9 mils thick.

The coating system has three dual layers of conductive layer/antifoulant layer on a wood primer over a wooden pier structure, supports, and pilings. On being subject to 120 volts RF from a Klystron tube system at a frequency suited to the polyphenylene sulfide molecule for one minute the conductive layer separates from the adjacent layers of polydimethylsiloxane and it and the outer antifoulant layer sinks to the ocean beach bottom where it can be salvaged and disposed of in an environmentally friendly way. The pier structure, supports and pilings when so treated then return to their unloaded configuration and the system receives an inspector's approval.

EXAMPLE 7

An operator on a nuclear submarine notices that the temperature of the seawater condenser coolant is heating up. On examination the chief engineer determines that the coolant pipes are heavily fouled creating an inefficient cooling effect.

As a result the captain orders that the engineer defoul the condenser heat exchanger pipes. The engineer then presses the defouling button which puts 175 volts AC for 40 seconds across each four foot long section of a conductive layer of a coating on the 6 inch diameter pipes. The conductive layer separates from the adjacent antifoulant layers and exits the pipe system. A clean fresh smooth antifoulant layer is exposed to the cooling water of the condenser of the nuclear reactor steam generation and condensation system. Almost immediately the heat exchanger becomes more efficient and the temperature of the condenser begins to decrease towards its normal value.

The conductive layers are made of polyphenylene vinylene. They are 15 mils thick with a resistivity of $10^3$ ohm-cm.

The antifoulant layers are made of polydimethylsiloxane containing ¼% silicone. They are 30 mils thick.

The coating array comprises 4 pairs of conductive layer/antifoulant layer. The coating system is applied to a primed polyvinyl chloride heat exchanger pipe with a special die when the pipe is extruded.

EXAMPLE 8

Nylon 66 is co-extruded with a polymer of carbon fiber filled high density polyethylene to form a coating array of 5 pairs. The nylon forms the antifoulant layers. The polyethylene forms the conductive layers.

The fiber loading in the polyethylene conductive layers is 20%. The conductive layers are ¼ mil thick with a resistivity of $10^3$ ohm-cm. The coefficient of thermal expansion is $2 \times 10^{-4}$ in/in/° C. The polyethylene has about 0.25% maleic anhydride functionality for adhesion purposes The coefficient of thermal expansion for the nylon antifoulant layers is $10^{-4}$ in/in/° C. The nylon is 3 mil thick.

On putting 100 volts of energy (DC) across the width of the bottom conductive layer for 45 seconds it heats up. The conductive layer's dimensions change with respect to the adjacent antifoulant layers' dimensions. Also the maleic acid bonds and interfacial attractions are broken and the conductive layer separates from the adjacent antifoulant layers.

OTHER APPLICATIONS

There are a number of other applications wherein a conductive layer separating from a substrate on command via a shock voltage and/or acoustic signal results in an important functional action. These include but are not limited to change in color of an interference filter, change in wavelength of a wave guide, switching of a router or other microelectronic device, shifting from one circuit to another on a printed circuit or a semiconductor or chip, change in features of a coated membrane, coated lens, or a lithographic surface, and release of medicines from a stent. These actions can involve a shift from electrical to photonic functions or visa-versa and can give rise to new and novel devices.

What I claim is:

1. A coating system, said coating system comprising a coating array of 1 to 100 pairs of alternating antifouling and conductive layers, said coating array comprising:
   a) a conductive layer, said conductive layer:
      i. comprises one or more of the polymers polythiophene, polyfluorene, polyethylene, polyvinyl chloride, polyphenylene sulfide, polyaniline, polypyrole, polyacetylene, polythiophene, polyphenylenevinylene or their derivatives;
      ii. optionally comprises a conductive filler material, said filler material comprising one or more of conductive carbon, carbon fibers, carbon nanotubes, stainless steel, copper or aluminum;
      iii. has a thickness in the range of ¼ mil to 200 mils; and
      iv. has an electrical resistivity in the range of $10^8$ ohm-cm to 1 ohm-cm; and
   b) an antifouling layer, said antifouling layer:
      i. comprises a low surface energy polymer, said polymer comprising one or more of polydimethylsiloxane, fluorinated polyurethane, fluorinated olefin, or their derivatives; and
      has a thickness in the range of ¼ mil to 300 mils;
      ii.
   whereby said conductive layer is bonded to said antifouling layer such that said bond is broken thus separating said conductive layer from said antifouling layer when said conductive layer is exposed to a pulse of energy of sufficient power and duration to heat said conductive layer without destroying said antifouling layer; and wherein said system comprises means for providing said pulse of energy to said conductive layer.

2. The system of claim 1 wherein said antifouling layer has a thickness in the range of 9 to 30 mils.

3. The system of claim 1 wherein said pulse of energy comprises a pulse of DC electric energy and a pulse of acoustic energy wherein said acoustic energy is tuned to the acoustic resonant frequency of said conductive layer and has an intensity of at least 200 decibels re 1 µPa and a duration of not more than 40 seconds.

4. The system of claim 1 wherein said system is adhered to a wooden piling immersed in sea water, said conductive layer substantially comprises polyphenylene sulfide and aluminum flakes, and said energy pulse substantially comprises RF electromagnetic energy tuned to a polyphenylene sulfide resonance.

5. The system of claim 1 wherein said system comprises a plurality of said coating arrays with means to independently apply energy pulses to each of said coating arrays and wherein said arrays are bonded to a submarine, said conductive layer substantially comprises polyethylene loaded with carbon fiber such that the bulk resistivity of said conductive layer is at least 1,000 ohm-cm, said antifoulant layer substantially comprises polydimethylsiloxane, said polyethylene has been modified to comprise carboxyl groups, said carboxyl groups serve to attach said conductive layer to said antifoulant layer via OH end terminations such that said antifoulant layer will debond from said conductive layer if said conductive layer is subjected to a DC voltage pulse of at least 200 volts along its length for at least 30 seconds.

6. The system of claim 1 wherein said antifouling layer substantially comprises polydimethylsiloxane with ¼% silicone.

7. The system of claim 1 wherein said system comprises one or more of said coating arrays with means to independently apply energy pulses to each of said coating arrays.

8. The system of claim 7 wherein each of said arrays comprises a corresponding medicine, said arrays are applied to a stent and each of said medicines is individually released from said corresponding array upon application of an energy pulse to a conductive layer of said corresponding array.

9. The system of claim 7 wherein said arrays are applied to an optical device, said optical device being an interference filter, wave guide, or coated lens, and wherein one or more optical properties of said optical device is changed upon the application of a corresponding energy pulse to a corresponding array.

10. The system of claim 9 wherein said optical device is an interference filter and at least one of said optical properties is color.

11. The system of claim 7 wherein said coating arrays are applied to an electronic device such that each of said arrays corresponds to one or more elements of the circuitry of said device and wherein each of said one or more elements changes upon application of an energy pulse to a conductive layer of the corresponding array.

12. The system of claim 11 wherein at least one of said changes in said elements of said circuitry comprises a change from electronic to photonic functionality or vice versa.

13. The system of claim 1 wherein the coefficient of thermal expansion of said conductive layer is between 2 and 5 times the coefficient of thermal expansion of said antifouling layer.

14. The system of claim 1 wherein the number of said pairs of layers is between 3 and 5 and said conductive layer substantially comprises high density polyethylene, 0.25% maleic anhydride and 20% carbon fiber.

15. The system of claim 1 wherein said coating array comprises at least 5 pairs of said alternating conductive and antifouling layers and wherein the combined thickness of all of said antifouling layers is sufficient to last 25 years when said array is applied to the hull of a nuclear submarine in service in temperate waters.

16. The system of claim 1 wherein said array is applied to the hull of a ship in service in cold waters and said system further comprises means to collect said conductive layer after said conductive layer is separated from said antifouling layer and means to dispose of said separated conductive layer and any other layers or materials adhering thereto beyond the 200 mile limit in an environmentally responsible manner.

17. The system of claim 1 wherein said array is adhered to the hull of a cruise ship and said system further comprises means to manually activate the application of said pulse of energy.

18. The system of claim 1 wherein said array is adhered to the inside of a pipe.

19. The system of claim 18 wherein said pipe is part of the cooling system for a nuclear power plant.

20. The system of claim 18 wherein said pipe is part of the cooling system for a nuclear submarine.

21. The system of claim 1 wherein said coating array is applied to the hull of a ship.

22. The system of claim 21 wherein said system further comprises an underwater station and said station comprises means to provide said energy pulse, said energy pulse being either an acoustical energy pulse, electrical energy pulse or both.

* * * * *